Patented June 5, 1934

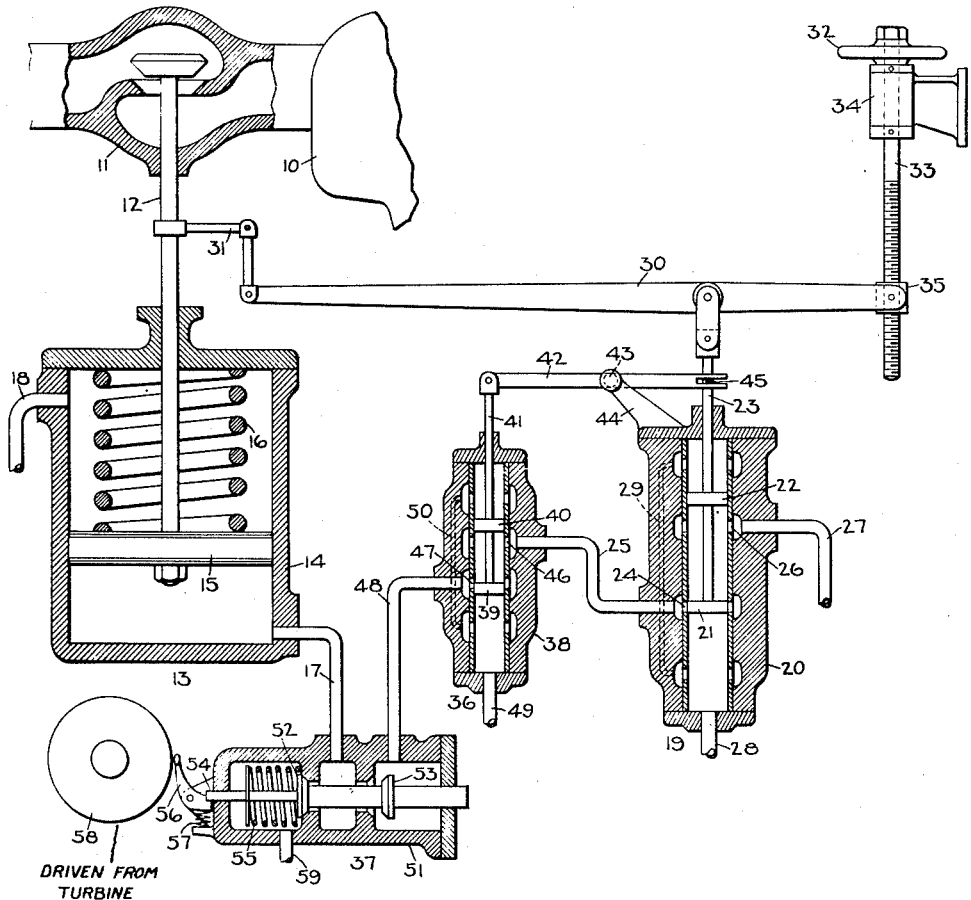

1,961,813

UNITED STATES PATENT OFFICE 1,961,813

REGULATING MECHANISM

Reed J. Caughey, Schenectady, N. Y., assignor to General Electric Company, a corporation of New York Application November 23, 1932, Serial No. 644,044

1 Claim. (Cl. 137—140)

The present invention relates to regulating mechanisms such as are used in connection with elastic fluid turbines for regulating the supply of elastic fluid to the turbines and for shutting off the supply at a predetermined speed of the turbine, although it is not necessarily limited thereto. More specifically the invention relates to regulating arrangements in which a regulating element such as an emergency stop and/or regulating valve is actuated by a fluid-actuated motor through the actuation of a regulating element, for instance, a hand wheel. In arrangements of this kind it is desirable to close the valve at a predetermined speed of the turbine by the provision of an emergency governor and it is also desirable to provide means which make it impossible to open the valve after it has been shut by the action of the emergency governor without resetting the regulating element.

The object of the present invention is to provide an improved construction and arrangement for the kind of regulating mechanism above specified.

For a consideration of what I believe to be novel and my invention, attention is directed to the following description and the claim appended thereto in connection with the accompanying drawing.

In the drawing, I have shown a regulating and emergency governing mechanism in connection with an elastic fluid turbine in accordance with my invention.

Referring to the drawing, a turbine 10 is provided with a valve means 11 which in the present example serves primarily as a throttle trip valve. A valve of this kind should be opened slowly in order to bring the turbine up to speed gradually and the valve must be closed when the speed exceeds a predetermined value. The valve is connected to the stem 12 of a motor, such as a hydraulic motor 13, comprising a cylinder 14 and a piston 15 fastened to the lower end of the stem 12 and biased in downward direction by a spring 16. The lower part of the cylinder has a port connected to a conduit 17 for conducting actuating fluid to and from the cylinder. The upper part of the cylinder has a port connected to a conduit 18 for draining actuating fluid leaking past the piston from the lower part to the upper part of the cylinder. The conducting of actuating fluid to and from the motor is controlled by a control member shown as an ordinary pilot valve 19 comprising a casing 20, pilot valve heads 21 and 22 movable in the casing and fastened to a stem 23. The lower valve head registers with a port 24 connected to a conduit 25. Intermediate the two valve heads which are shown in their normal or original position is a port 26 connected to a conduit 27 for conducting actuating fluid, such as oil, to the pilot valve. A conduit 28 at the lower end of the pilot valve serves for draining actuating fluid from the lower part of the valve, which part is connected to the upper part through a channel 29. Fluid leaking past the upper valve head is conducted through channel 29 to the lower part of the valve. The valve stem 23 is pivoted to an intermediate point of a floating lever 30 which in turn is connected through links 31 to the stem 12 of the motor. The right-hand end of floating lever 30 is connected to a regulating or actuating element shown as a hand wheel 32 fastened to a rod 33 having an upper portion guided in a guide 34 and a lower portion screw-threaded and engaging a nut 35 fastened to the right-hand end of the floating lever 30.

Turning of the hand wheel causes the nut to travel in either direction on the rod and thereby to turn the floating lever in clockwise or counter-clockwise direction.

Assuming conduit 25 of the pilot valve were directly connected to conduit 17, such arrangement would be typical of any kind of arrangement for moving a valve or regulated element by means of a motor including a control member or pilot valve actuated by a regulated element such as a hand wheel. The operation of this mechanism is as follows: In order to open the valve, hand wheel 32 is moved in a direction to cause nut 35 to travel downward, that is, to turn lever 30 in clockwise direction about its left-hand end as a fulcrum. The valve head 21 of the pilot valve thereby moves downward and permits the supply of actuating fluid from the conduit 27 to the conduit 17 to the lower part of the cylinder 14. The piston 15 thereby moves upward against the biasing force of the spring and causes opening of the valve 11. The upward movement of the piston also causes the left-hand end of the floating lever 30 to turn upward about its right-hand end as a fulcrum. This causes the valve head 21 of the pilot valve to move upward to resume its original position in which it covers the port 24 and prevents further supply of actuating fluid to the motor. This is a well-known arrangement of a motor and a control member connected by a follow-up mechanism.

According to the embodiment of my invention shown in the drawing I provide between the conduits 25 and 17 another valve shown as a pilot valve 36 in series with a trip or reversing valve 37. The pilot valve 36, hereafter termed an auxiliary pilot valve, comprises a casing 38 and valve heads 39 and 40 fastened on a stem 41. The stem 41 is pivoted to the left-hand end of a lever 42 having an intermediate point 43 fulcrumed on a bracket 44 on the pilot valve cylinder 20. The right-hand end of the fulcrumed lever 42 is forked and engages a pin 45 on the stem 23 of the pilot valve 19, the latter being termed the main pilot valve. The lever 42 forms a follow-up connection between the main pilot valve and the auxiliary pilot valve. A port 46 of the auxiliary pilot valve 36 is connected to the conduit 25 and another port 47 is connected to a conduit 48. A drain conduit 49 is connected to the lower part of the pilot valve and communicates through a channel 50 with the upper part of the auxiliary pilot valve. The auxiliary pilot valve 36 is shown in its normal position in which the lower valve head 39 partly uncovers its port 47, to permit communication between the conduits 25 and 48.

The reversing valve 37 has a casing 51, two valve heads 52 and 53 respectively, of which 52 normally engages its seat whereas 53 is opened. The valve heads are fastened to a stem 54 on which is provided a spring 55 tending to reverse the valve position. Valve 37 is held normally in the position shown in the drawing by a trip finger 56 which engages the left-hand end of stem 54 and normally is held in this position by a spring 57. An emergency governor 58, diagrammatically indicated in the drawing, which is driven by the turbine, moves the trip finger 56 away from its engagement with the stem 54 at a predetermined speed of the turbine. During normal operation the reversing valve 37 permits communication between the conduits 17 and 48 so that oil or like actuating fluid may be supplied to the cylinder 14. If during emergency conditions finger 56 is tripped, the valve heads 52 and 53 are moved to the left under action of the spring 54 so that the valve head 53 engages its seat and disconnects the conduit 17 from the conduit 48. The valve 52 opens and connects the conduit 17 with a drain conduit 59 of the reversing valve, to the effect that the actuating fluid contained in the cylinder 14 is drained through the conduits 17 and 59, and causes closing of the valve 11.

During normal operation the actuation of the valve by moving the hand wheel is similar to the operation of the apparatus above described but with the difference that a positive actuation of the regulated element can only be accomplished by the slow turning of the regulating hand wheel, or from another viewpoint effective actuation of the regulating element takes place only as long as the regulated element or the motor for moving the regulated element responds to the movement called for by the regulated element. A slow downward movement of the right-hand end of the floating lever 30 by turning of the hand wheel causes a slight downward movement of the valve head 21 of the main pilot valve so that this valve head slightly uncovers its port. At the same time the valve head 39 of the pilot valve or auxiliary valve 36 is moved in a direction to cover its port, or from another viewpoint the valve head 21 is moved in a direction to permit the supply of actuating fluid to the motor whereas the valve head 39 is moved in a direction to disconnect the motor from its source of supply for actuating fluid, which movement is accomplished by the turning motion of the fulcrumed lever 42. However, a slow downward movement of the valve head 21 still permits the supply of actuating fluid from the conduit 27 through the main pilot valve, the conduit 25 through the port 47 of the auxiliary pilot valve, the conduit 48, the reversing valve, the conduit 17 to the lower part of the motor cylinder 14. Thus the slow actuating of the hand wheel 32 and the restoring action of the follow-up levers 30 and 42 permit movement of the motor 13 between the two end positions of the valve 11. When the hand wheel 32 is turned rapidly, the valve head 39 moves upward far enough to cover the port 47 and thus prevents the supply of actuating fluid to the motor 13 owing to the fact that there is a lag between movement of the main pilot valve by the hand wheel 32 and the restoring of the original position of the main pilot valve by the movement of the motor and the follow-up lever 30. This is an important feature of my invention as it prevents the operator from moving the regulating element, more specifically, nut 35 on rod 33, into a position which does not correspond to the position of the regulated element or valve 11. When the valve 11 is in an intermediate position and the hand wheel 32 is turned rapidly in a direction to further open the valve 11, the valve head 39 of the auxiliary pilot valve is moved rapidly in upward direction into a position in which it not only prevents the supply of actuating fluid through the port 47 but connects this port with the drain conduit 49 so that actuating fluid is drained from the motor cylinder 14. In other words, too rapid actuation of the hand wheel 32 in opening direction for the valve causes closing thereof.

Let us assume that the valve has been shut by the emergency governing mechanism comprising the emergency governor 58 and the reversing valve 37 from a position shown in the drawing. Closing of the valve by the emergency governor causes reversing of the trip or reversing valve 37 so that actuating fluid is drained from the lower part of the cylinder 14 as above described. The resulting downward movement of the stem 12 also causes turning of the floating lever 30, to the effect that the main pilot valve head 21 moves downward whereas the auxiliary pilot valve head 39 moves upward. More specifically, the latter moves into a position in which it disconnects the conduit 25 from the conduit 48 and connects the conduit 48 with the drain conduit 49. This is an important feature of my improved arrangement as it makes it impossible to restart the turbine merely by resetting the reversing or trip valve as it will be readily seen that resetting of the reversing valve is not sufficient to permit the supply of actuating fluid to the motor owing to the position of the auxiliary pilot valve head 39. To restart the turbine it is moreover necessary to move the auxiliary pilot valve head 39 downward and accordingly the main pilot valve head 21 upward. The piston 15 being in a position in which the valve 11 is closed, that is, in a no-load position, moving of the valve heads 21 towards their original position means therefore to move the hand wheel 32 or the regulating element into a corresponding, that is, a no-load position.

Summarizing, after the valve has once been shut by action of the emergency governing mechanism it can only be reopened after the whole regulating mechanism has been moved into no-load position.

With my invention I have accomplished an improved regulating mechanism with which effective actuation of the regulated element is only possible as long as the regulated element substantially follows the action called for by the regulating element. In such an arrangement the positions of both elements correspond to each other, or, from another angle, the arrangement permits only a predetermined differential movement between the regulating means and the regulated means, that is, with reference to the embodiment shown in the drawing it cannot happen that during normal operation the nut 35 is in half-load position whereas the valve 11 is in quarter-load position. The arrangement allows only small differences in the relative positions of the two elements and as soon as these differences reach a certain predetermined maximum value the regulated element or valve is closed. Another advantage of my improved arrangement is that for starting the turbine it is necessary to put the regulating element in a no-load position before the regulated element or valve can be reopened after it has been shut by the emergency governing mechanism.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

The combination with an elastic fluid turbine having a valve in its inlet conduit, a hydraulic motor for moving the valve, a pilot valve for controlling the motor, and a hand wheel for moving the pilot valve, of means for conducting actuating fluid from the pilot valve to the motor, said means including another valve having a follow-up connection with the pilot valve and a port normally partially covered by the valve head, a reversing valve between the other valve and the motor, and an emergency governor driven by the turbine for reversing the valve.

REED J. CAUGHEY.